No. 772,097. Patented October 11, 1904.

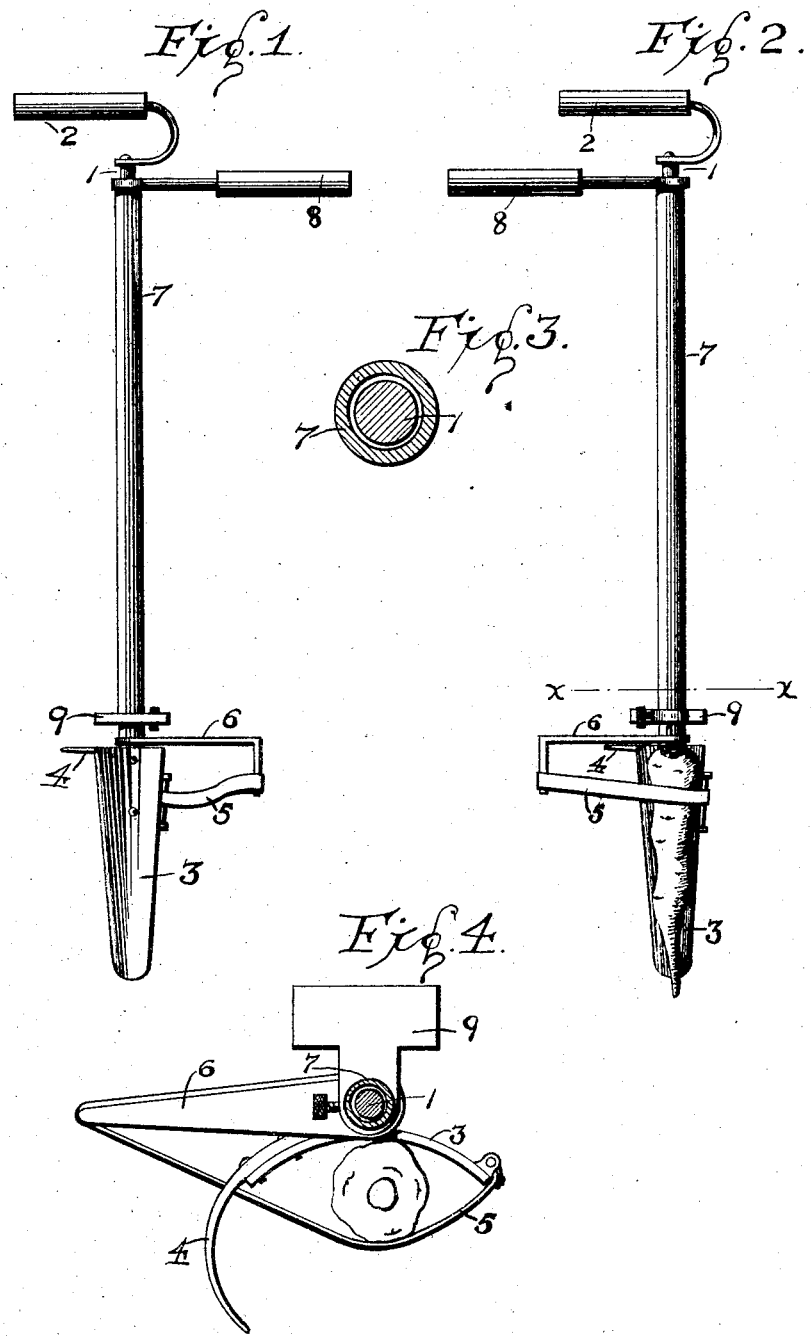

UNITED STATES PATENT OFFICE.

GEORGE LOUIS HAYES, OF ROSEBURG, OREGON, ASSIGNOR OF ONE-HALF TO WILLIAM M. HODSON, OF ROSEBURG, OREGON.

BEET TOPPER AND LIFTER.

SPECIFICATION forming part of Letters Patent No. 772,097, dated October 11, 1904.

Application filed July 6, 1904. Serial No. 215,501. (No model.)

*To all whom it may concern:*

Be it known that I, GEORGE LOUIS HAYES, a citizen of the United States, residing at Roseburg, in the county of Douglas and State of Oregon, have invented certain new and useful Improvements in Beet Toppers and Lifters; and I do hereby declare the following to be a full, clear, and exact description of the invention, such as will enable others skilled in the art to which it appertains to make and use the same.

My invention relates to improvements in beet toppers and lifters adapted to be operated by hand.

It has for its object to provide a handy implement of simple construction, cheap of manufacture, and durable.

The invention consists in the features of construction and combinations of parts hereinafter described, and more particularly pointed out in the claims.

In the accompanying drawings, illustrating the preferred embodiment of my invention, Figure 1 is a front elevation of my device in position to be thrust into the ground to engage a beet. Fig. 2 is a front elevation showing the device engaging a beet which has been topped by the knife-arm carrying the strap which clamps the beet. Fig. 3 is a cross-sectional view taken centrally through the rod, tube, &c.; and Fig. 4 is a cross-sectional view taken on line *x x* of Fig. 2, showing more particularly the cutting-knife, stop-arm, and securing means for the strap.

Referring more particularly to the drawings, a rod 1 has a handle 2 fixed at its top and a curved trowel-shaped or concavo-convex plate 3 at its lower end. To the upper portion of said plate 3, preferably at its outer surface, is secured a projecting (preferably curved) stop-arm 4, which is adapted to strike the surface of the ground and arrest the downward thrust of the device. Said plate 3 has connected thereto one end of a strap or band 5, the other end of which is secured to an angular extension of a blade 6. Said blade is fixed to the lower end of a tubular member 7, mounted around the rod 1 and carrying a handle-arm 8 at its upper end. A gage-arm 9 is slidably adjusted to the tubular member 7, preferably by means of a set-screw, just above the blade or knife. It moves with the knife and regulates the portion of the top of the beet to be cut off.

The plate or blade 3 is thrust into the ground at the side of a beet in the position shown in Fig. 1 until the stop-arm comes in contact with the surface of the ground. The handle-arm 8 is then turned by one hand, while the rod 1 is held firm by the other engaging the handle 2. By this movement the knife will be brought across the top of the beet, severing the top therefrom, and at the end of the stroke the strap or band will be in engagement with the beet, clamping it within the concave face of the plate 3, when the instrument is raised, bringing the beet with it.

It is obvious that detail changes may be made in my invention without departing from the spirit or sacrificing the advantages thereof. For instance, the upper edge of the plate 3 may be turned over to form the gage or stop and said plate may be flattened out of the end of the rod. Also a spiral spring may be used instead of the leather strap. I therefore reserve the right to make such changes as fairly fall within the scope of my invention.

Having thus described my invention, what I claim as new, and desire to secure by Letters Patent, is—

1. In a device of the character described, a plate adapted to be inserted into the ground, and having a flexible band connected thereto, an arm adapted to move with relation to said plate and also secured to said flexible band, and means to operate said plate and arm.

2. In a device of the character described, a concavo-convex plate, adapted to be inserted into the ground and having a flexible band connected thereto, an arm adapted to move with relation to said plate and also secured to said flexible band, and means to operate said plate and arm.

3. In a device of the character described, a plate having a stop to limit its insertion into the ground and having a flexible band connected to said blade, an arm adapted to move with relation to said plate and also secured to said flexible band, and means to operate said plate and arm.

4. In a device of the character described, a plate adapted to be inserted into the ground and having a flexible band connected thereto, a knife-arm adapted to move with relation to said plate to top the beet and also secured to said flexible band, and means to operate said plate and arm.

5. In a device of the character described, a plate adapted to be inserted into the ground, connected to a rod having a handle, a tubular member mounted around said rod and also having a handle, said tubular member carrying a knife-arm adapted to top the beet and means connected to said arm and plate to clasp the beet to extract the same after the beet has been topped.

6. In a device of the character described, a plate adapted to be inserted into the ground, connected to a rod, a tubular member mounted around said rod and carrying a knife-arm and an adjustable gage-arm, means to actuate said tubular member, knife and gage with relation to said rod to top a beet and means connected to said arm and plate to clasp the beet to extract the same after it has been topped.

In testimony whereof I affix my signature in presence of two witnesses.

GEORGE LOUIS HAYES.

Witnesses:
F. ROGERS,
J. C. FULLERTON.